US012683175B2

(12) United States Patent (10) Patent No.: US 12,683,175 B2

Ito (45) Date of Patent: Jul. 14, 2026

(54) REDOX FLOW BATTERY SYSTEM AND METHOD FOR OPERATING REDOX FLOW BATTERY

(71) Applicant: Sumitomo Electric Industries, Ltd., Osaka (JP)

(72) Inventor: Takefumi Ito, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 652 days.

(21) Appl. No.: 18/024,265

(22) PCT Filed: Aug. 23, 2021

(86) PCT No.: PCT/JP2021/030778

§ 371 (c)(1),
(2) Date: Mar. 1, 2023

(87) PCT Pub. No.: WO2022/070671

PCT Pub. Date: Apr. 7, 2022

(65) Prior Publication Data

US 2023/0268533 A1 Aug. 24, 2023

(30) Foreign Application Priority Data

Sep. 29, 2020 (JP) ................................. 2020-164157

(51) Int. Cl.
 *H01M 8/04858* (2016.01)
 *H01M 8/0432* (2016.01)
 (Continued)

(52) U.S. Cl.
 CPC ..... *H01M 8/04865* (2013.01); *H01M 8/0432* (2013.01); *H01M 8/04567* (2013.01); *H01M 8/188* (2013.01)

(58) Field of Classification Search
 CPC ............. H01M 8/188; H01M 8/04567; H01M 8/0432; H01M 8/04865
 See application file for complete search history.

(56) References Cited

U.S. PATENT DOCUMENTS

2021/0104758 A1* 4/2021 Tanimoto .......... H01M 8/04567
2021/0151782 A1* 5/2021 Shibata ............. H01M 8/04582

FOREIGN PATENT DOCUMENTS

AT 505559 B1 * 2/2009 .............. H01M 8/20
CA 2784695 A1 * 6/2011 ........ H01M 8/04552
 (Continued)

OTHER PUBLICATIONS

AT-505559 MT (Year: 2009).*
 (Continued)

*Primary Examiner* — Alexander Usyatinsky

(74) *Attorney, Agent, or Firm* — McCarter & English, LLP; Michael A. Sartori

(57) ABSTRACT

A redox flow battery system includes a battery cell that performs charge-discharge by supplying an electrolyte; a monitor cell to which the electrolyte is supplied; a voltmeter that measures an open circuit voltage of the monitor cell; a thermometer that measures a liquid temperature of the electrolyte; and a controller that controls the charge-discharge of the battery cell based on the open circuit voltage, and the controller corrects the open circuit voltage in accordance with the liquid temperature.

5 Claims, 4 Drawing Sheets

(51) Int. Cl.
*H01M 8/04537* (2016.01)
*H01M 8/18* (2006.01)

(56) References Cited

FOREIGN PATENT DOCUMENTS

| | | | |
|---|---|---|---|
| JP | 2008-527647 | A | 7/2008 |
| JP | 2009-016217 | A | 1/2009 |
| JP | 2013-037857 | A | 2/2013 |
| JP | 2014-137898 | A | 7/2014 |
| KR | 10-2019-0011392 | A | 2/2019 |
| WO | WO-2006/076059 | A2 | 7/2006 |
| WO | WO-2015/163367 | A1 | 10/2015 |
| WO | 2020-026655 | A1 | 2/2020 |
| WO | WO 2020026655 | * | 2/2020 |

OTHER PUBLICATIONS

The decision of JPO to grant a Patent for Application JP 2 (Year: 2026).*
Supplementary European Search Report issued in EP Application No. 21874974.5 dated Apr. 23, 2025.

* cited by examiner

REDOX FLOW BATTERY SYSTEM AND METHOD FOR OPERATING REDOX FLOW BATTERY

TECHNICAL FIELD

The present disclosure relates to a redox flow battery system and a redox flow battery operation method.

This application claims priority based on Japanese Patent Application No. 2020-164157 filed on Sep. 29, 2020, the entire contents of which are incorporated herein by reference.

BACKGROUND ART

PTLs 1, 2 disclose a redox flow battery including a monitor cell to which an electrolyte common to the electrolyte supplied to the battery cell is supplied separately from the battery cell that performs charge-discharge. This redox flow battery grasps a state of charge (SOC) of the electrolyte by measuring an open circuit voltage (OCV) of the monitor cell.

CITATION LIST

Patent Literature

PTL 1: Japanese Patent Laying-Open No. 2009-16217
PTL 2: Japanese Patent Laying-Open No. 2013-37857

SUMMARY OF INVENTION

A redox flow battery system of the present disclosure includes:
  a battery cell that performs charge-discharge by supplying an electrolyte;
  a monitor cell to which the electrolyte is supplied;
  a voltmeter that measures an open circuit voltage of the monitor cell;
  a thermometer that measures a liquid temperature of the electrolyte; and
  a controller that controls the charge-discharge of the battery cell based on the open circuit voltage, and the controller corrects the open circuit voltage in accordance with the liquid temperature.
A redox flow battery operation method of the present disclosure is a redox flow battery operation method for performing charge-discharge by supplying an electrolyte to a battery cell, the method including:
  measuring an open circuit voltage of a monitor cell to which the electrolyte is supplied;
  measuring a liquid temperature of the electrolyte;
  correcting the open circuit voltage in accordance with the liquid temperature; and
  performing the charge-discharge of the battery cell based on the corrected open circuit voltage.

PROBLEM TO BE SOLVED BY THE PRESENT DISCLOSURE

Figure 1:
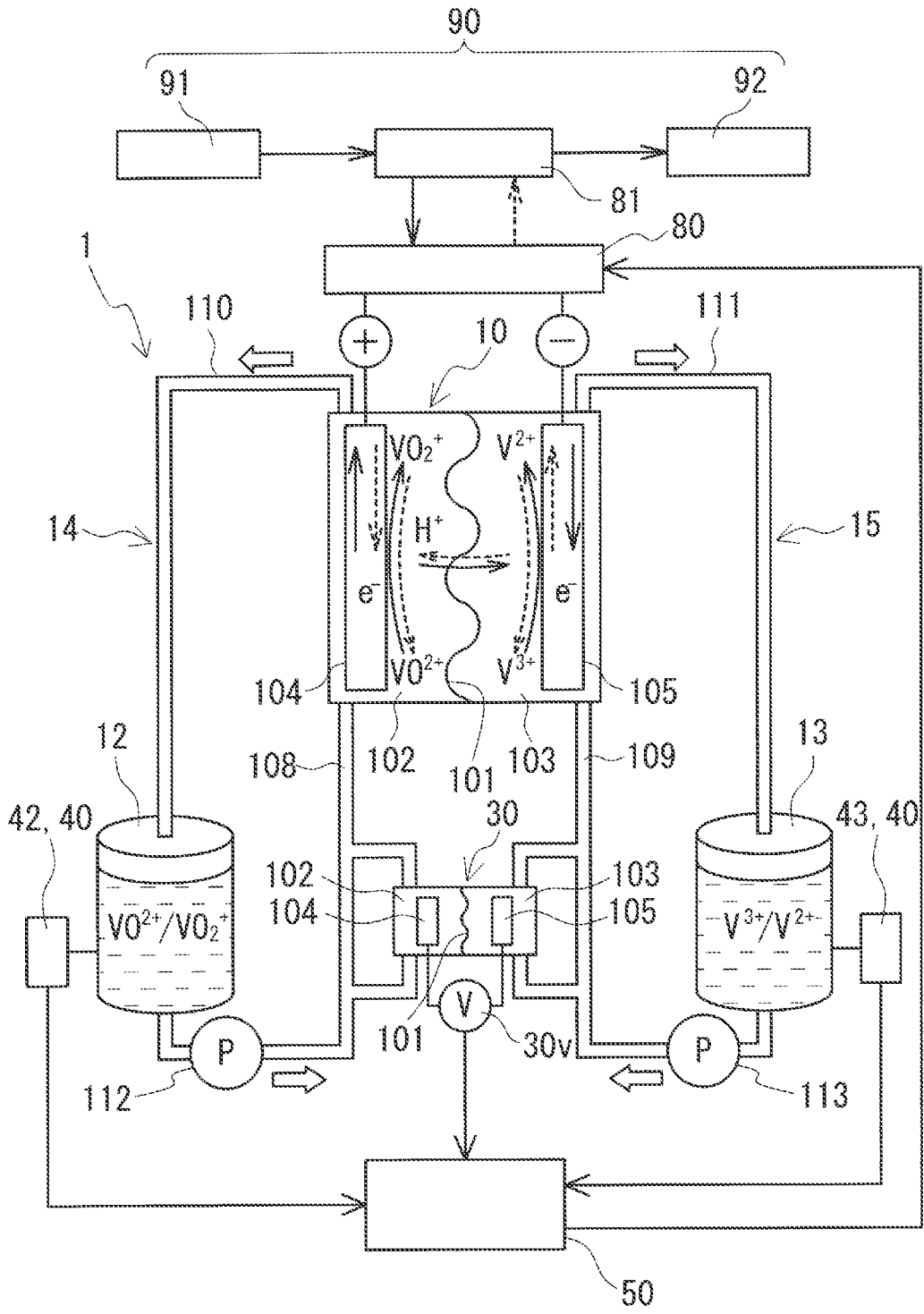
FIG. 1 is a schematic diagram illustrating a configuration of a redox flow battery system according to an embodiment.

In the redox flow battery, the electrolyte is controlled so as not to be overcharged during operation.

When the electrolyte is overcharged, the electrolyte is electrolyzed in the battery cell to generate gas, or a side reaction in which active material ion is deposited is generated. For example, oxygen is generated at the positive electrode and hydrogen is generated at the negative electrode by electrolysis of water in the electrolyte. In addition, because the active material ions are reduced by the deposition of the active material ions in the electrolyte, there is a possibility that battery capacity is reduced.

An object of the present disclosure is to provide a redox flow battery system and a redox flow battery operation method capable of preventing overcharge of the electrolyte.

Advantageous Effect of the Present Disclosure

The redox flow battery system and the redox flow battery operation method of the present disclosure can prevent the overcharge of the electrolyte.

DESCRIPTION OF EMBODIMENTS

As the redox flow battery operation method, it is known that the charge-discharge of the battery cell is controlled based on an open circuit voltage of the monitor cell. The open circuit voltage of the monitor cell is obtained by measuring a potential of the electrolyte, more specifically, a potential difference between the positive electrolyte and the negative electrolyte.

There is a correlation between the OCV of the monitor cell and the SOC of the electrolyte. In the redox flow battery, an OCV limited range in which the electrolyte is not overcharged or overdischarged at a certain reference temperature is previously set, and the charge-discharge is sometimes controlled such that the measured OCV is within the limited range. For example, when the OCV measured value exceeds the upper limit value of the limited range during the charge, it is regarded as an overcharged state, and the charge is stopped. When the OCV measured value is less than the lower limit value of the limited range during the discharge, it is regarded as an overdischarge state, and the discharge is stopped. When the liquid temperature of the electrolyte increases, the reference potential of the electrolyte decreases, and the OCV also decreases. That is, the OCV has temperature dependency. When the liquid temperature of the electrolyte is higher than the reference temperature, the OCV measured value appears lower than the OCV measured at the reference temperature. Consequently, in a state where the liquid temperature of the electrolyte is higher than the reference temperature, there is a risk that the SOC of the electrolyte deviates from an appropriate range even when the measured OCV is within the limited range. Accordingly, when the liquid temperature of the electrolyte is different from the reference temperature, there is a risk that the electrolyte is overcharged or overdischarged.

Furthermore, in order to expand the use range of the SOC of the electrolyte, it is studied that the upper limit value of the OCV limit range is set as high as possible within the range in which the electrolyte is not overcharged. In order to prevent the electrolyte from being overcharged, it can be said that the temperature dependence of the OCV is required to be considered. The present inventor proposes that the correction of the OCV measured value in accordance with the liquid temperature of the electrolyte such that the SOC of the electrolyte falls within an appropriate range.

The present disclosure has been made in view of the above circumstances.

First, embodiments of the present disclosure will be listed and described.

(1) A redox flow battery system according to the embodiment of the present disclosure includes:

a battery cell that performs charge-discharge by supplying an electrolyte;

a monitor cell to which the electrolyte is supplied;

a voltmeter that measures an open circuit voltage of the monitor cell;

a thermometer that measures a liquid temperature of the electrolyte; and a controller that controls the charge-discharge of the battery cell based on the open circuit voltage, and the controller corrects the open circuit voltage in accordance with the liquid temperature.

The redox flow battery system of the present disclosure can prevent the overcharge of the electrolyte. This is because the measured OCV is corrected in accordance with the liquid temperature of the electrolyte. The SOC of the electrolyte can be maintained in an appropriate range by controlling the charge-discharge of the battery cell based on the corrected OCV.

(2) The controller corrects at least an upper limit value of the open circuit voltage as one aspect of the redox flow battery system.

In the above aspect, the overcharge of the electrolyte can be prevented.

(3) The electrolyte contains a vanadium ion as one aspect of the redox flow battery system.

In the above aspect, the positive electrolyte and the negative electrolyte contain the vanadium ions as active material ions. In the redox flow battery, repetition of the charge-discharge sometimes causes active material ions in the electrolyte to move between the positive electrolyte and the negative electrolyte through a membrane in the battery cell. In the above aspect, the active material ions of both the positive electrolyte and the negative electrolyte are ions of the same element. Consequently, a decrease in battery capacity can be easily prevented even when the active material ions move between the positive electrolyte and the negative electrolyte. When the active material ion in the positive electrolyte and the active material ion in the negative electrolyte are the ion of the same element, the positive electrolyte and the negative electrolyte can function as the active material in the electrolyte.

(4) A redox flow battery operation method according to the embodiment of the present disclosure is a redox flow battery operation method for performing charge-discharge by supplying an electrolyte to a battery cell, the method including:

measuring an open circuit voltage of a monitor cell to which the electrolyte is supplied;

measuring a liquid temperature of the electrolyte;

correcting the open circuit voltage in accordance with the liquid temperature; and performing the charge-discharge of the battery cell based on the corrected open circuit voltage.

The redox flow battery operation method of the present disclosure can prevent the overcharge of the electrolyte. This is because the measured OCV is corrected in accordance with the liquid temperature of the electrolyte. The SOC of the electrolyte can be maintained in an appropriate range by performing the charge-discharge of the battery cell based on the corrected OCV.

DETAILED EMBODIMENTS OF THE PRESENT DISCLOSURE

Specific examples of a redox flow battery system and a redox flow battery operation method of the present disclosure will be described with reference to the drawings. Hereinafter, the redox flow battery is sometimes referred to as an "RF battery". In the drawings, the same reference numerals denote the same or corresponding parts.

The present invention is not limited to these examples, but is indicated by the claims, and is intended to include meanings equivalent to the claims and all modifications within the scope.

<Outline of RF Battery System>

With reference to FIG. 1, an RF battery system 1 according to an embodiment will be described. RF battery system 1 supplies a positive electrolyte and a negative electrolyte to a battery cell 10 to perform charge-discharge. The positive electrolyte and the negative electrolyte contain active material ions. FIG. 1 illustrates, as an example, a V based RF battery in which both the positive electrolyte and the negative electrolyte contain vanadium (V) ions as active materials. In FIG. 1, a solid arrow indicates a charge reaction and a broken arrow indicates a discharge reaction. The electrolyte to be used is not limited to the vanadium electrolyte, but an electrolyte having a known composition can be used. Examples of the electrolyte include a Ti—Mn based electrolyte containing manganese (Mn) ions in the positive electrolyte and titanium (Ti) ions in the negative electrolyte.

RF battery system 1 is typically connected to a power system 90 through an AC/DC converter 80 and a transformer facility 81. RF battery system 1 can charge power generated by a power generation portion 91 and discharge the charged power to a load 92. Power generation portion 91 is a power generation facility using natural energy such as solar power generation or wind power generation, or another general power plant. For example, RF battery system 1 is used for load leveling, instantaneous voltage drop compensation, emergency power supply, and output smoothing of natural energy power generation.

<Configuration of RF Battery System>

RF battery system 1 includes a battery cell 10, a positive electrolyte tank 12 that stores the positive electrolyte, a negative electrolyte tank 13 that stores the negative electrolyte, and a positive flow channel 14 and a negative flow channel 15 that circulate the electrolytes between tanks 12, 13 and battery cell 10. One of features of RF battery system 1 of the embodiment is that RF battery system 1 includes a monitor cell 30, a voltmeter 30v, a thermometer 40, and a controller 50.

Battery Cell)

Battery cell 10 performs the charge-discharge. Battery cell 10 includes a positive electrode 104, a negative electrode 105, and a membrane 101 interposed between positive electrode 104 and negative electrode 105. Battery cell 10 is separated into a positive electrode cell 102 and a negative electrode cell 103 by membrane 101. For example, membrane 101 is a cation film. Positive electrode 104 is built in positive electrode cell 102. Negative electrode 105 is built in negative electrode cell 103. A positive electrolyte is supplied to positive electrode cell 102. A negative electrolyte is supplied to negative electrode cell 103.

Positive flow channel 14 and negative flow channel 15 include supply pipes 108, 109 and return pipes 110, 111. Each of supply pipes 108, 109 sends each electrolyte from each of tanks 12, 13 to each of cells 102,103 constituting battery cell 10. Each of return pipes 110, 111 returns each electrolyte from each of cells 102, 103 constituting battery cell 10 to each of tanks 12, 13. Pumps 112, 113 are provided in supply pipes 108, 109, respectively.

Figure 2:
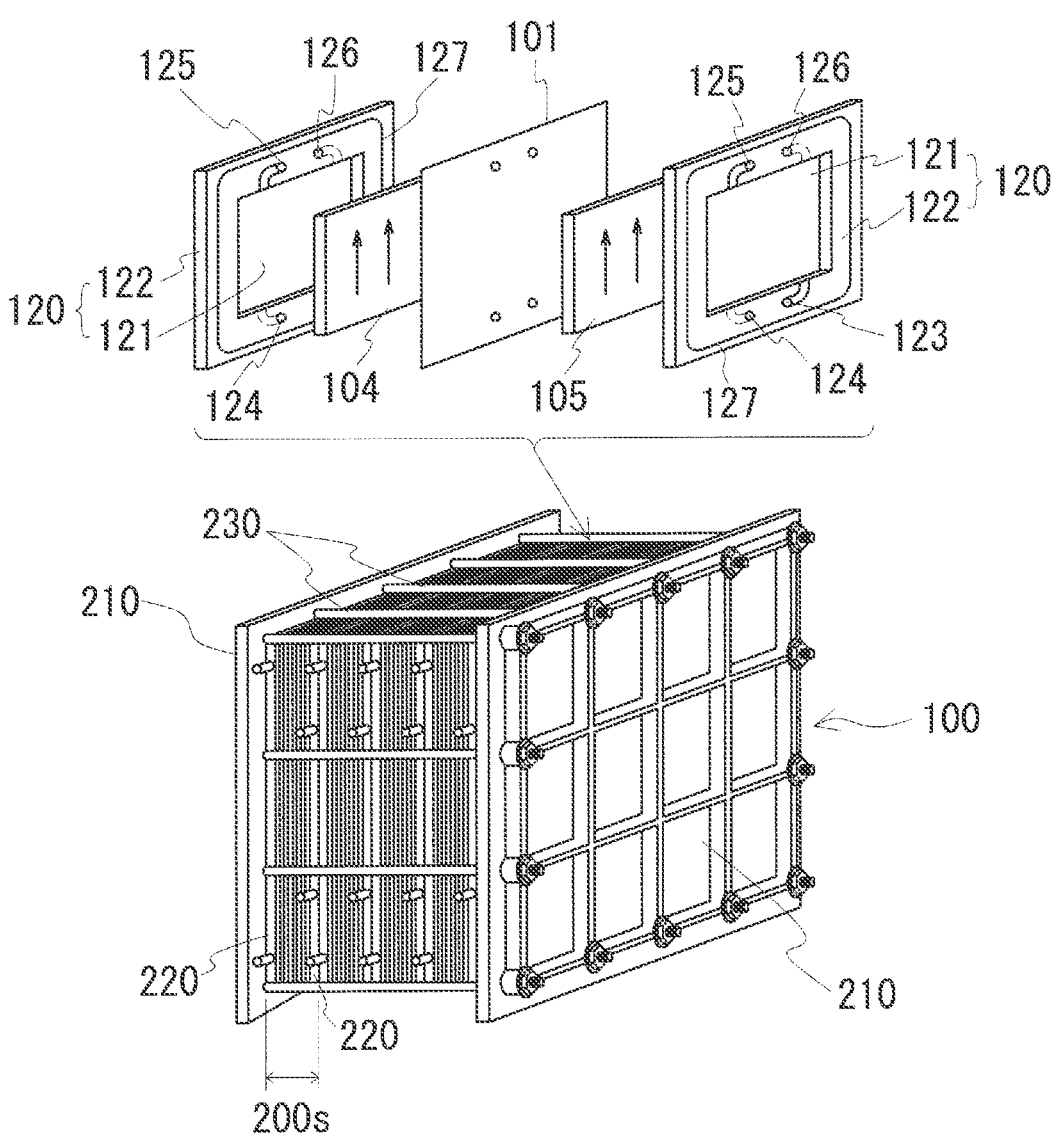
FIG. 2 is a schematic diagram illustrating a configuration of a cell stack.

RF battery system 1 usually uses a cell stack 100 in which a plurality of battery cells 10 are laminated as illustrated in FIG. 2. Cell stack 100 is configured by sandwiching a sub-stack 200s between two end plates 210 from both sides of sub-stack 200s and tightening sub-stack 200s by a tightening mechanism 230. FIG. 2 illustrates cell stack 100 including a plurality of sub-stacks 200s. Sub-stack 200s has a structure, in which a cell frame 120, positive electrode 104, membrane 101, and negative electrode 105 are repeatedly laminated in this order and supply/drainage plates 220 are disposed at both ends of the multilayer body. Supply pipes 108, 109 and return pipes 110, 111 in FIG. 1 described above are connected to supply/drainage plate 220. The number of laminated battery cells 10 in cell stack 100 can be appropriately selected.

As illustrated in FIG. 2, cell frame 120 includes a bipolar plate 121 and a frame body 122. Bipolar plate 121 is disposed between positive electrode 104 and negative electrode 105. Frame body 122 is provided around bipolar plate 121. Positive electrode 104 is disposed on a first surface side of bipolar plate 121, namely, on a front side of a space in FIG. 2 so as to face each other. Negative electrode 105 is disposed on a second surface side of bipolar plate 121, namely, on a back side of the space in FIG. 2 so as to face each other. Positive electrode 104 and negative electrode 105 are accommodated inside frame body 122 with bipolar plate 121 interposed therebetween. Positive electrode 104 and negative electrode 105 are disposed between bipolar plates 121 of adjacent cell frames 120 with membrane 101 interposed therebetween, thereby forming one battery cell 10. An annular seal member 127 such as an O-ring is disposed between frame bodies 122 of cell frames 120 in order to prevent leakage of the electrolyte.

Frame body 122 of cell frame 120 includes liquid supply manifolds 123, 124 and liquid drainage manifolds 125, 126. In this example, the positive electrolyte is supplied from liquid supply manifold 123 to positive electrode 104 through a groove formed in a lower portion on the first surface side of frame body 122. The positive electrolyte supplied to positive electrode 104 is discharged to liquid drainage manifold 125 through a groove formed in an upper portion on the first surface side of frame body 122. Similarly, the negative electrolyte is supplied from liquid supply manifold 124 to negative electrode 105 through a groove formed in a lower portion on the second surface side of frame body 122. The negative electrolyte supplied to negative electrode 105 is discharged to liquid drainage manifold 126 through a groove formed in an upper portion on the second surface side of frame body 122. Liquid supply manifolds 123, 124 and liquid drainage manifolds 125, 126 are provided to penetrate frame body 122, and form the flow channel of each electrolyte by stacking cell frame 120. Each of these flow channels communicates with supply pipes 108, 109 and return pipes 110, 111 in FIG. 1 through supply/drainage plate 220. In cell stack 100, the positive electrolyte and the negative electrolyte can be distributed to respective battery cells 10 through the respective flow channels.

(Electrolyte)

The positive electrolyte and the negative electrolyte are typically aqueous solutions containing active material ions. For example, a sulfuric acid ($H_2SO_4$) aqueous solution, a phosphoric acid ($H_3PO_4$) aqueous solution, and a nitric acid ($HNO_3$) aqueous solution can be used as the aqueous solution. The active material ion is an ion of an element that functions as an active material in the electrolyte. Examples of the active material ions include ions of an element selected from a group consisting of vanadium (V), manganese (Mn), iron (Fe), chromium (Cr), titanium (Ti), and zinc (Zn). Typical examples of the active material ion of the positive electrolyte include a V ion, a Fe ion, and a Mn ion. Typical examples of the active material ions of the negative electrolyte include the V ion, a Cr ion, a Ti ion, and a Zn ion. These active material ions may be used alone or in combination. In the embodiment, both the positive electrolyte and the negative electrolyte are the sulfuric acid aqueous solution containing the V ion.

The active material ion in the positive electrolyte and the active material ion in the negative electrolyte may be ions of different elements or ions of the same element. Specific combinations of the active material ions used in the positive electrolyte and the negative electrolyte are illustrated below.

(1) Positive electrolyte: V ions ($VO^{2+}/VO_2^+$), negative electrolyte: V ions ($V^{3+}/V^{2+}$)

(2) Positive electrolyte: Fe ions ($Fe^{2+}/Fe^{3+}$), negative electrolyte: Cr ions ($Cr^{3+}/Cr^{2+}$)

(3) Positive electrolyte: Mn ion ($Mn^{2+}/Mn^{3+}$, negative electrolyte: Ti ion ($TiO^{2+}/Ti^{3+}$)

(4) Positive electrolyte: Fe ions ($Fe^{2+}/Fe^{3+}$), negative electrolyte: Ti ions ($TiO^{2+}/Ti^{3+}$)

(5) Positive electrolyte: Mn ion ($Mn^{2+}/Mn^{3+}$), negative electrolyte: Zn ion ($Zn^{2+}/Zn$)

The $VO^{2+}$ is a tetravalent V ion. The $VO_2^+$ is a pentavalent V ion.

The $TiO^{2+}$ is a tetravalent Ti ion.

The positive electrolyte and the negative electrolyte may contain the active material ion of the same element. Specifically, the active material ion contained in the positive electrolyte and the active material ion contained in the negative electrolyte may be the ion of the same element. Furthermore, all ions containing the active material ions contained in both the positive electrolyte and the negative electrolyte may be ions of the same element. Because each of the positive electrolyte and the negative electrolyte contains the active material ion of the same element, a decrease in battery capacity is easily prevented even when the active material ion moves between the positive electrolyte and the negative electrolyte due to repetition of the charge-discharge.

(Monitor Cell)

The electrolyte common to the electrolyte supplied to battery cell 10 is supplied to monitor cell 30. That is, the positive electrolyte supplied to battery cell 10 and the positive electrolyte supplied to monitor cell 30 are supplied from positive electrolyte tank 12. The negative electrolyte supplied to battery cell 10 and the negative electrolyte supplied to monitor cell 30 are supplied from negative electrolyte tank 13. The SOC of the electrolyte supplied to monitor cell 30 is the same as the SOC of the electrolyte supplied to battery cell 10. Monitor cell 30 does not perform the charge-discharge. Monitor cell 30 is provided in the middle of positive flow channel 14 and negative flow channel 15. In the embodiment, the positive electrolyte and the negative electrolyte are supplied to monitor cell 30 from supply pipe 108 of positive flow channel 14 and supply pipe 109 of negative flow channel 15, respectively.

The configuration of monitor cell 30 is similar to that of battery cell 10. Monitor cell 30 includes positive electrode 104, negative electrode 105, and membrane 101. Positive electrode 104 and negative electrode 105 are built in positive electrode cell 102 and negative electrode cell 103 separated by membrane 101, respectively.

(Voltmeter)

Voltmeter 30v measures the open circuit voltage (OCV) of monitor cell 30. The OCV means voltage between positive electrode 104 and negative electrode 105 in monitor cell 30, namely, a potential difference between the positive electrolyte and the negative electrolyte. The SOC of the electrolyte can be obtained by measuring the OCV of monitor cell 30. The value of the OCV measured by voltmeter 30v is transmitted to controller 50. Voltmeter 30v includes any measuring instrument capable of measuring the voltage or a physical quantity that can be converted into the voltage.

(Thermometer)

Thermometer 40 measures a liquid temperature of the electrolyte. In the embodiment, thermometer 40 measures the temperature of each of the positive electrolyte and the negative electrolyte. Thermometer 40 includes a positive electrode thermometer 42 that measures a liquid temperature of the positive electrolyte and a negative electrode thermometer 43 that measures a liquid temperature of the negative electrolyte. The value of the liquid temperature measured by each of thermometers 42, 43 is transmitted to controller 50. Thermometer 40 includes any measuring instrument capable of measuring the temperature or a physical quantity convertible to the temperature.

The attachment position of thermometer 40 is not particularly limited as long as thermometer 40 can measure the liquid temperature of the electrolyte. In the embodiment, positive electrode thermometer 42 is provided in positive electrolyte tank 12. Negative electrode thermometer 43 is provided in negative electrolyte tank 13. Positive electrode thermometer 42 may be provided in positive flow channel 14. Negative electrode thermometer 43 may be provided in negative flow channel 15. Positive electrode thermometer 42 and negative electrode thermometer 43 may be provided in monitor cell 30.

(Controller)

Controller 50 controls not only the operation of RF battery system 1, but also an operation required for monitoring and improving the state of RF battery system 1.

Controller 50 is typically constituted by a computer. The computer includes a processor, and a memory. The memory stores a program causing the processor to execute the processing performed by controller 50. The processor reads and executes the program stored in the memory. The program includes a command group related to processing by controller 50. The processing procedure performed by controller 50 will be described in detail in the section of <RF battery operation method> described later.

Controller 50 controls the charge-discharge of battery cell 10 based on the OCV of monitor cell 30 measured by voltmeter 30v. Controller 50 of the embodiment corrects the OCV in accordance with the liquid temperature of the electrolyte measured by thermometer 40. The charge-discharge control performed by controller 50 uses the corrected OCV obtained by correcting the OCV.

<Charge-Discharge Control>

The charge-discharge control performed by controller 50 will be described.

The memory of controller 50 stores an OCV limit range. The OCV limited range is a voltage range in which the charge-discharge is performed. An upper limit value of the limit range is an upper limit voltage during charge. The lower limit value of the limit range is a lower limit voltage during discharge. Controller 50 performs the charge-discharge when the OCV is within the limited range, and stops the charge-discharge when the OCV is outside the limited range. The OCV limited range is a preset range of the OCV in which the electrolyte is not overcharged or overdischarged at a reference temperature. In other words, the limited range is the range of the appropriate SOC at the reference temperature. The reference temperature may be a temperature within the operating temperature range of the electrolyte. For example, the reference temperature is 25° C.

<OCV Temperature Correction>

OCV temperature correction performed by controller 50 will be described. Information about a temperature characteristic of the electrolyte is previously stored in a memory of controller 50. The temperature characteristic of the electrolyte indicates a relationship between a potential and the liquid temperature of the electrolyte. The temperature characteristic of the electrolyte can be determined by a test. The OCV temperature correction performed by controller 50 includes acquiring or calculating the potential of the electrolyte in accordance with the liquid temperature of the electrolyte from the above information, and correcting the OCV based on the potential. With this temperature correction, the OCV of monitor cell 30 measured by voltmeter 30v can be corrected to the OCV corresponding to the reference temperature described above. The control of charging and discharging by controller 50 described above is performed based on the temperature-corrected OCV.

In the embodiment, a potential temperature coefficient of the active material ion is used as the temperature characteristic of the electrolyte. The potential temperature coefficient indicates a rate at which a standard electrode potential of the active material ion changes when the temperature of the electrolyte rises by 1° C. The unit is [mV/K]. A sign of the potential temperature coefficient being "−" means that the potential decreases with an increase in temperature. The respective potential temperature coefficients depending on the types of active material ions are illustrated below.

(Potential Temperature Coefficient of Active Material Ion)

V ion ($VO^{2+}/VO_2^+$): −0.901 [mV/K]
V ion ($V^{3+}/V^{2+}$): 1.5 [mV/K]
Fe ion ($Fe^{2+}/Fe^{3+}$): 1.175 [mV/K]
Cr ion ($Cr^{3+}/Cr^{2+}$): 1.4 [mV/K]
Mn ion ($Mn^{2+}/Mn^{3+}$): 1.8 [mV/K]
Ti ion ($TiO^{2+}/Ti^{3+}$): −2.7 [mV/K]
Zn ion ($Zn^{2+}/Zn$): 0.119 [mV/K]

(Temperature Correction Method)

OCV temperature correction calculation processing is performed as follows. A temperature difference between the measured liquid temperature of the electrolyte and the reference temperature is calculated. With reference to the potential temperature coefficient of the active material ion, a change amount of the reference potential with respect to the OCV at the reference temperature is calculated from the potential temperature coefficient and the temperature difference. The OCV is corrected by adding the change amount of the reference potential from the measured OCV of the monitor cell. A specific temperature correction calculation method will be described. It is assumed that the reference temperature is Tb [° C.], the measured value of the OCV is X [V], the liquid temperature of the positive electrolyte is Tp [° C.], the liquid temperature of the negative electrolyte is Tn

[° C.], the potential temperature coefficient of the active material ion of the positive electrolyte is αp [mV/K], and the potential temperature coefficient of the active material ion of the negative electrolyte is αn [mV/K]. The unit of the potential temperature coefficient is [mV/K]. The unit of the liquid temperature of the electrolyte is [° C.]. The "K" in the unit of the potential temperature coefficient is a unit representing an absolute temperature. "° C." that is the unit of the liquid temperature is a unit representing the Celsius temperature. The absolute temperature and the Celsius temperature are only different in reference temperature, and have the same unit size. That is, 1K=1° C. The unit of the potential temperature coefficient [mV/K] has the same meaning as [mV/° C.]. The change amount A of the reference potential can be calculated by [(αp×(Tp–Tb))–(αn×(Tn–Tb))]. Then, the OCV is corrected by setting [X+A]. When at least the upper limit value of the OCV is corrected, the overcharge can be prevented.

Figure 3:
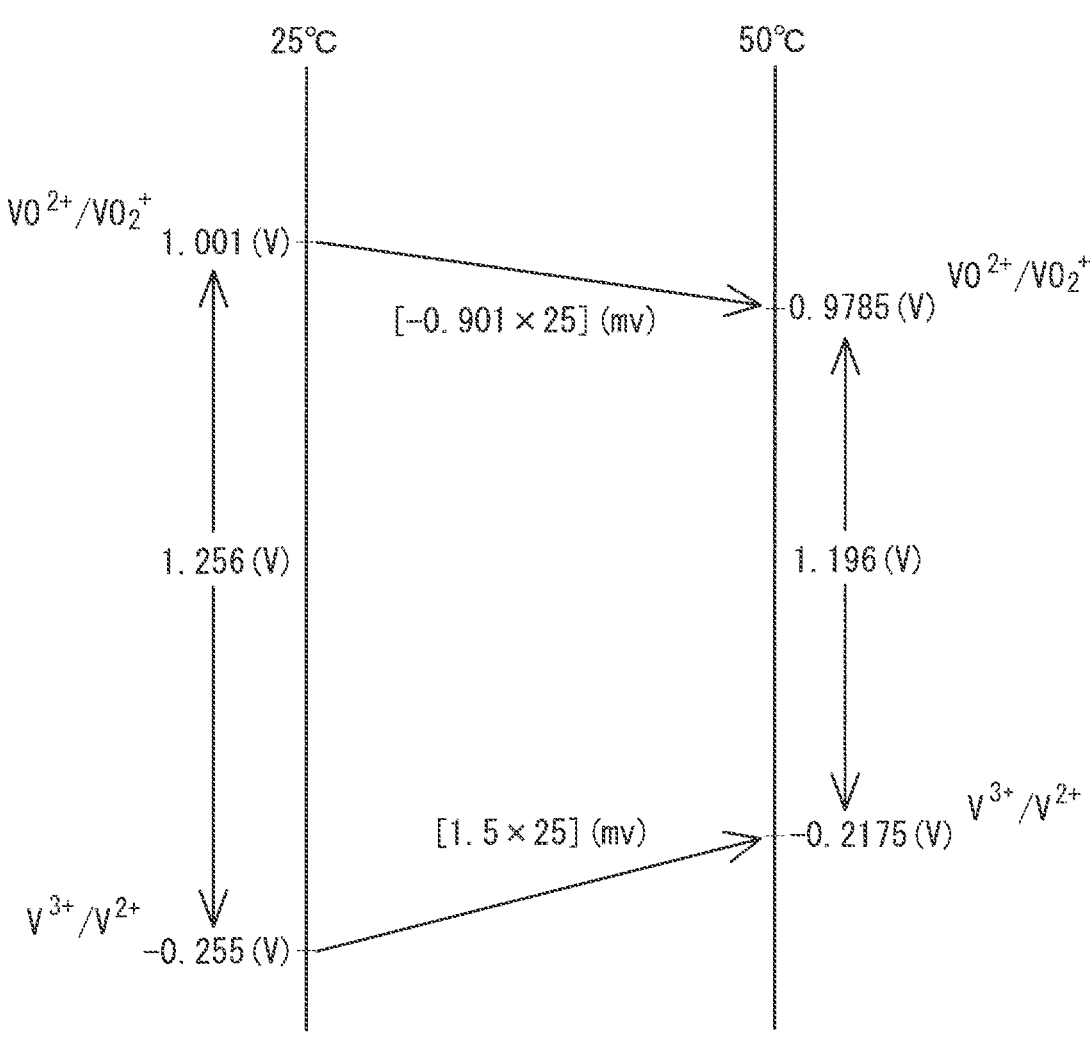
FIG. 3 is a view illustrating an example of OCV temperature correction in the redox flow battery system of the embodiment.

With reference to FIG. 3, a specific example of the temperature correction will be described. The active material ion of the positive electrolyte is tetravalent or pentavalent V ions ($VO^{2+}/VO_2^+$). The active material ion of the negative electrolyte is trivalent or divalent V ions ($V^{3+}/V^{2+}$). The reference temperature is 25° C. The limited range of the OCV at 25° C. that is the reference temperature is less than or equal to 1.33 V and less than or equal to 1.60 V. In the example of FIG. 3, it is assumed that the potential of the active material ions ($VO^{2+}/VO_2^+$) of the positive electrolyte at 25° C. is 1.001 V based on a hydrogen generation potential. In addition, it is assumed that the potential of active material ions ($V^{3+}/V^{2+}$) of the negative electrolyte at 25° C. is –0.255 V. In this case, the difference between the reference potential of the positive electrolyte and the reference potential of the negative electrolyte at 25° C., namely, the reference potential of the OCV is 1.256 V. The temperature of each of the positive electrolyte and the negative electrolyte is 50° C. That is, it is assumed that the liquid temperature of the electrolyte rises by 25° C. from the reference temperature. When the temperature of the electrolyte increases by 1° C., the reference potential of the positive electrolyte shifts by –0.901 mV, namely, decreases by 0.901 mV. In addition, the reference potential of the negative electrolyte shifts by 1.5 mV, namely, increases by 1.5 mV. As illustrated in FIG. 3, when the liquid temperature of the positive electrolyte increases from 25° C. to 50° C., the potential of active material ions ($VO^{2+}/VO_2^+$) of the positive electrolyte decreases by [0.901×25] mV as compared with the case of 25° C., so that the potential becomes 0.9785 V. When the liquid temperature of the negative electrolyte increases from 25° C. to 50° C., the potential of the active material ions ($V^{3+}/V^{2+}$) of the negative electrolyte increases by [1.5×25] mV as compared with the case of 25° C., so that the potential becomes –0.2175 V. In this case, the reference potential of the OCV at 50° C. is 1.196 V. Accordingly, for a temperature increase of 25° C., the reference potential of the OCV decreases by about 60 mV by [(0.901+1.5)×25]. That is, the reference potential of the OCV at the liquid temperature of the electrolyte of 50° C. decreases by 60 mV with respect to the reference potential of the OCV at the reference temperature. This means that the OCV measured when the liquid temperature of the electrolyte is 50° C. is lower by 60 mV than the OCV measured when the liquid temperature of the electrolyte is 25° C. Consequently, when the charge is performed to a state where the OCV is 1.6 V under the condition where the liquid temperature of the electrolyte is 50° C., it means that the charge is performed to a state where the OCV is 1.66 V under the condition of 25° C. Accordingly, under the condition that the liquid temperature of the electrolyte is 50° C., 60 mV that is the amount of change in the reference potential is added to the measured OCV by the above-described temperature correction to correct the OCV. This correction is synonymous with the correction of the OCV limited range to more than or equal to 1.27 V and less than or equal to 1.54 V under the condition that the liquid temperature of the electrolyte is 50° C.

<RF Battery Operation Method>

Figure 4:
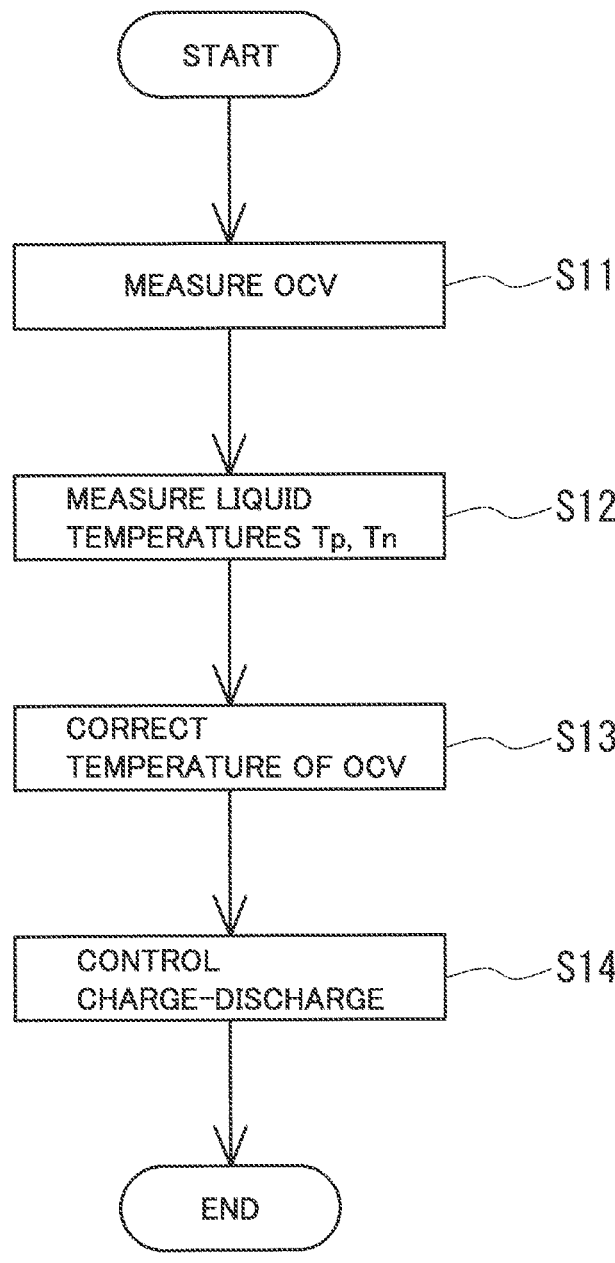
FIG. 4 is a flowchart illustrating a processing procedure of a redox flow battery operation method of the first embodiment.

With reference to FIG. 4, the RF battery operation method of the embodiment will be described. In the RF battery operation method, the positive electrolyte and the negative electrolyte are supplied to battery cell 10 to perform the charge-discharge using above-described RF battery system 1. One of the features of the RF battery operation method of the embodiment is that the method includes a first process S11, a second process S12, a third process S13, and a fourth process S14 as illustrated in FIG. 4. The same contents as those described in RF battery system 1 may be sometimes omitted.

(First Process)

First process S11 is a process of measuring the OCV of monitor cell 30. The OCV of monitor cell 30 is measured using voltmeter 30v.

(Second Process)

Second process S12 is a process of measuring the liquid temperature of the electrolyte. Specifically, liquid temperature Tp of the positive electrolyte and liquid temperature Tn of the negative electrolyte are measured. Liquid temperatures Tp, Tn are measured using thermometers 42, 43 described above.

(Third Process)

Third process S13 is a process of correcting the OCV measured in first process S11 in accordance with the liquid temperature of the electrolyte measured in second process S12. In third process S13, the measured value of the OCV is corrected by arithmetic processing described in the above section (Temperature correction method). The third process S13 is processing executed by controller 50 described above.

(Fourth Process)

In fourth process S14, the charge-discharge of battery cell 10 is performed based on the OCV corrected in third process S13. Specifically, when the corrected OCV is within the above-described limited range, the charge-discharge is performed. When the corrected OCV is out of the above-described limited range, the charge-discharge is stopped. That is, when the corrected OCV exceeds the upper limit voltage of the limited range during the charge, the charge is stopped. When the corrected OCV is lower than the lower limit voltage of the limited range during the discharge, the discharge is stopped.

Advantageous Effect

RF battery system 1 and the RF battery operation method of the embodiment have the following effects.

The overcharge of the electrolyte can be prevented. This is because the measured value of OCV is corrected in accordance with the liquid temperature of the electrolyte. The SOC of the electrolyte can be maintained in an appropriate range by controlling the charge-discharge based on the corrected OCV.

Test Example 1

The RF battery system having the configuration similar to that of the embodiment was prototyped. The RF battery system was used to evaluate the case where the OCV temperature correction was performed and the case where the OCV temperature correction was not performed.

The electrolyte of the sulfuric acid aqueous solution containing the V ion is used as the positive electrolyte and the negative electrolyte. This electrolyte is obtained by dissolving 0.5 M of the V ion in the aqueous solution having the sulfuric acid concentration of 1 M. The V ion in the positive electrolyte is tetravalent or pentavalent ($VO^{2+}$/$VO_2^+$). The V ion in the negative electrolyte is trivalent or divalent ($V^{3+}$/$V^{2+}$).

In the RF battery system using the electrolyte, the limited range of the OCV at 25° C. that is the reference temperature is greater than or equal to 1.33 V and less than or equal to 1.60 V.

(Sample No. 10)

Sample No. 10 is the RF battery system that does not perform the temperature correction. In sample No. 10, a charge-discharge cycle test of the RF battery system is performed while the temperature of each of the positive electrolyte and the negative electrolyte is maintained at 50° C. Both the charge and the discharge are performed at a constant current with current density of 50 mA/cm². The charge is performed until the measured value of the OCV reaches 1.60 V that is the same as the upper limit value of the limited range. The discharge is performed until the measured value of OCV reaches 1.33 V that is the same as the lower limit value of the limited range. That is, the control is performed such that switch to the discharge is performed when the measured value of the OCV reaches 1.6 V during the charge and such that switch to the charge is performed when the measured value of the OCV reaches 1.33 V during the discharge.

(Sample No. 1)

Sample No. 1 is the RF battery system that performs the temperature correction. In sample No. 1, the charge-discharge cycle test of the RF battery system is performed while the respective liquid temperatures of the positive electrolyte and the negative electrolyte are maintained at 50° C. in the same manner as in sample No. 10 except that the limited range of the OCV is changed. Similarly to sample No. 10, the charge-discharge is performed at the constant current with the current density of 50 mA/cm². In sample No. 1, the control is performed to switch to the discharge when a corrected OCV value described later reaches 1.6 V during the charge, and the control is performed to switch to the charge when the corrected OCV value reaches 1.33 V during the discharge.

In sample No. 1, the corrected OCV is obtained by adding the change amount of the reference potential with respect to the OCV at 25° C. to the measured value of the OCV. The change amount of the reference potential can be calculated from the temperature difference between the reference temperature and the potential temperature coefficient of the active material ion of the positive electrolyte and the potential temperature coefficient of the active material ion of the negative electrolyte. Under the condition that the liquid temperature of the electrolyte in sample No. 1 is 50° C., the reference potential of the OCV decreases by 60 mV with respect to the temperature increase of 25° C. Accordingly, sample No. 1 performs the charge-discharged with the value obtained by adding 60 mV to the measured value of the OCV. That is, in sample No. 1, the limited range of the OCV is changed to greater than or equal to 1.27 V and less than or equal to 1.54 V. Specifically, the control is performed to switch to the discharge when the measured value of the OCV reaches 1.54 V during the charge, and the control is performed to switch to the charge when the measured value of the OCV reaches 1.27 V during the discharge.

For each of the above samples, the charge-discharge cycle was repeated at least 100 times, and then the presence or absence of gas generation was examined. As a result, in sample No. 1, the generation of the gas was not confirmed. On the other hand, in sample No. 10, the generation of the gas was confirmed. In addition, when the battery capacity of each sample was compared after the charge-discharge cycle test, the battery capacity of sample No. 1 was higher than that of sample No. 10. Accordingly, it is considered that the overcharge was prevented in sample No. 1.

REFERENCE SIGNS LIST

1: redox flow battery system (RF battery system)
10: battery cell
    101: membrane, 102: positive electrode cell, 103: negative electrode cell
    104: positive electrode, 105: negative electrode
12: positive electrolyte tank, 13: negative electrolyte tank
14: positive flow channel, 15: negative flow channel
    108, 109: supply pipe, 110, 111: return pipe
    112, 113: pump
30: monitor cell
30v: voltmeter
40: thermometer
42: positive electrode thermometer, 43: negative electrode thermometer
50: controller
80: AC/DC converter, 81: transformer facility
90: power system, 91: power generation portion, 92: load
100: cell stack
200s: sub-stack
120: cell frame
121: bipolar plate, 122: frame body
123, 124: liquid supply manifold, 125, 126: liquid drainage manifold
127: seal member
210: end plate, 220: supply/drainage plate, 230: tightening mechanism

The invention claimed is:

1. A redox flow battery system comprising:
a battery cell that performs charge-discharge by supplying an electrolyte;
a monitor cell to which the electrolyte is supplied;
a voltmeter that measures an open circuit voltage of the monitor cell;
a thermometer that measures a liquid temperature of the electrolyte; and
a controller that controls the charge-discharge of the battery cell based on the open circuit voltage,
wherein the electrolyte comprises an active material ion, and
wherein the controller is configured to correct the open circuit voltage in accordance with the liquid temperature, wherein the controller is configured to correct the open circuit voltage by:
    calculating a temperature difference between the liquid temperature and a reference temperature;
    calculating a change amount of a reference potential with respect to the open circuit voltage at the reference temperature using a potential temperature coefficient of the active material ion and the temperature difference; and correcting the open circuit voltage by adding the change amount of the reference potential to the open circuit voltage.

2. The redox flow battery system according to claim 1, wherein the controller corrects at least an upper limit value of the open circuit voltage.

3. The redox flow battery system according to claim 1, wherein the electrolyte contains a vanadium ion.

4. A redox flow battery operation method for performing charge-discharge by supplying an electrolyte comprising an active material ion to a battery cell, the method comprising:

measuring an open circuit voltage of a monitor cell to which the electrolyte is supplied;

measuring a liquid temperature of the electrolyte;

correcting the open circuit voltage in accordance with the liquid temperature; and performing the charge-discharge of the battery cell based on the corrected open circuit voltage, wherein correcting the open circuit voltage comprises the steps of:

calculating a temperature difference between the liquid temperature and a reference temperature;

calculating a change amount of a reference potential with respect to the open circuit voltage at the reference temperature using a potential temperature coefficient of the active material ion and the temperature difference; and correcting the open circuit voltage by adding the change amount of the reference potential to the open circuit voltage.

5. The redox flow battery system according to claim 2, wherein the electrolyte contains a vanadium ion.

* * * * *